June 17, 1941.   H. C. KUHN   2,245,792
GAUGE
Filed June 14, 1938

INVENTOR
Herman C. Kuhn
BY
Pennie, Davis, Marvin & Edmonds
ATTORNEYS

Patented June 17, 1941

2,245,792

UNITED STATES PATENT OFFICE 2,245,792

GAUGE

Herman C. Kuhn, Hammond, Ind., assignor to Sinclair Refining Company, New York, N. Y., a corporation of Maine Application June 14, 1938, Serial No. 213,588

5 Claims. (Cl. 33—178)

This invention is concerned with testing the cross-sectional dimensions of relatively long passages and provides an improved gauge for such purpose. The invention finds particular application in testing tubes of circular bore for maximum internal cross-sectional diameter, but may be employed to investigate passages having other than circular cross-section.

It is difficult to measure wall thickness of tubing directly, but inasmuch as the external cross-sectional dimensions usually are substantially uniform throughout its length, internal cross-sectional dimensions may be taken as indices of wall thickness. If at any point throughout the length of such a tube a maximum internal dimension is exceeded, the wall adjacent the point at which the dimension is exceeded is too thin and the tube should be discarded. Thus with seamless tubing such as is employed in boilers, oil stills and the like, the outside cross-sectional diameter is usually substantially constant, but the wall tends to be thicker at the end portions, so that the thin and potentially dangerous wall section and the greatest internal cross-sectional diameter are likely to occur in the tube at a point remote from the ends and consequently not detectable with heretofore customary devices such as inside calipers. However, I have invented an apparatus which may be employed to determine internal cross-sectional dimensions of a section of a passage irrespective of whether or not the section is accessible or even visible from an end of the passage, and which offers an accurate, reliable, rapid and simple means for determining whether or not a given tube has an internal diameter such that its wall thickness is unsafe for a contemplated service.

My invention contemplates a gauge for testing the cross-sectional dimensions of a passage, and especially a passage that is relatively long with respect to its cross-section, which comprises a base having side portions adapted to engage the wall of the passage at at least two points across a section thereof, an arm pivoted to the base and adapted to swing outwardly therefrom to engage the wall of the passage at a third point, and means for causing said arm to collapse when the arm has swung outwardly from the base through a predetermined angle. My invention also contemplates a gauge for the aforementioned purpose comprising a base having side portions adapted to engage the wall of the passage at both sides thereof, an arm pivoted to the base and adapted to swing outwardly from the base along the length thereof, means for forcing the arm outwardly from the base until the outer end thereof bears against the wall of the passage, and means for indicating the angle assumed by the arm with respect to the base. In a presently preferred form of the apparatus of my invention, the base is a plate having substantially parallel rounded sides and of such width as to slide easily into the passage to be tested. The arm is pivoted to the plate by a pivot substantially parallel to the major surface thereof and transverse to its length so that the arm may swing in a plane parallel to the sides and perpendicular to another plane defined by the sides. The means for forcing the arm to swing outwardly from the base to bear against the wall of the passage is a spring disposed between the arm and the base. The maximum angle assumed by the arm with respect to the base as the gauge is moved through the passage may be indicated either by causing the arm to swing through a perpendicular position with respect to the base and thus collapse under the influence of the spring, or by the position attained with respect to a gauge plate by a rotatable pointer mounted on the pivot. Preferably, the length of the arm is adjustable so that it may be set to collapse when, in a perpendicular position, it reaches a point in the passage where a tolerable internal cross-sectional dimension is exceeded. Preferably also, the outer end of the arm is provided with a roller to reduce frictional resistance as the gauge is drawn through the passage. These and other features of my invention will be understood more thoroughly in the light of the following detailed description taken in conjunction with the accompanying drawing, in which:

Figure 1:
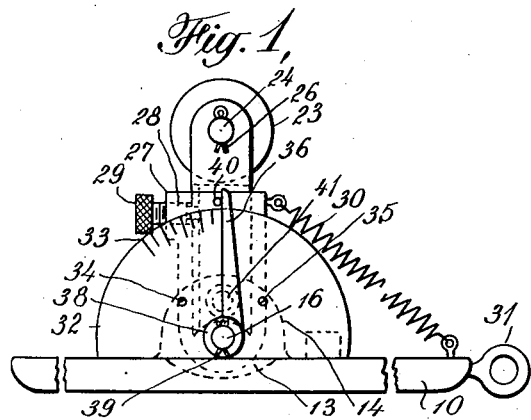
Fig. 1 is a side elevation of a presently-preferred form of the gauge of my invention.
Figure 2:
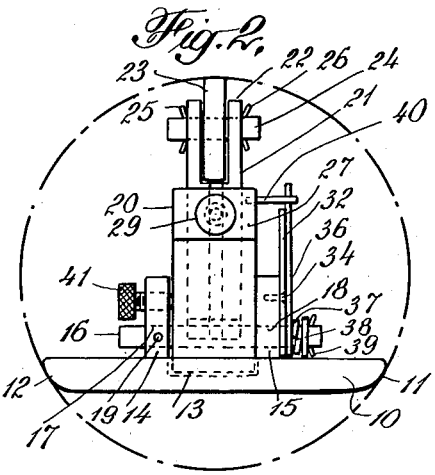
Fig. 2 is a rear end elevation of the apparatus of Fig. 1 shown in position within a tube which is indicated by a circle of broken line.
Figure 3:
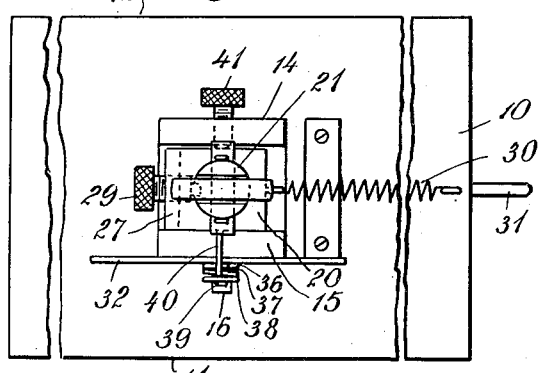
Fig. 3 is a plan of the apparatus of Fig. 1.

Referring now to the drawing, the apparatus comprises a rectangular base plate 10 having rounded side portions 11, 12 adapted to engage tangentially the wall of the tube and slide thereon. The base plate is provided with a recess 13 and with a pair of posts 14, 15 disposed respectively on either side of the recess and extending substantially perpendicular to the major surface of the base. A pivot shaft 16 passes through openings 17, 18 in posts 14 and 15 respectively, and is positioned substantially parallel to the major surface of the base but with its axis transverse to the longitudinal axis of the base. A pin 19 is provided to key the pivot shaft 16 in the post 14 and thus prevent both rotation and lateral movement of the shaft. The pivot shaft also passes through an arm 20 which is disposed between the two posts and is rotatable around the shaft. The arm is provided with an interior longitudinal slot in which is fitted and slidably mounted an extension 21. The outer end of this extension is forked and in the fork 22 is rotatably mounted a roller 23 on a shaft 24. The shaft is disposed parallel to the pivot shaft 16 and is keyed into the fork by keys 25, 26. On the rear face of the arm and near the top thereof is a boss 27 through which passes a threaded hole 28. A set screw 29 is disposed in the threaded hole to hold the extension in any desired position. A tension spring 30 is fastened to an upper position on the forward face of the arm and to a point on the longitudinal axis of the base forward of the arm. This spring is of such length and strength as to pull the arm through a perpendicular position with respect to the base plate. A ring 31 is fastened on the front edge of the base so that a cord, wire, or other means may be attached for pulling the gauge through a passage to be investigated.

A semi-circular gauge plate 32 provided with graduations 33 is mounted on the outside of the post 15 by means of screws 34, 35. The pivot shaft passes through the center of the arc described by the gauge plate and through one end of a pointer member 36 which is forced against the gauge plate by a small compression spring 37 held between the pointer member and a washer 38. A key 39 passing through the pivot shaft holds the washer in position. Disposed in a hole on the side of the arm adjacent the post 15 is a pin 40 adapted to engage the pointer member and slide it over the gauge plate. A set screw 41 is threaded through the post 14 above the pivot shaft and is adapted to hold the arm perpendicular to the base plate while the extension is set to a desired position.

The gauge is useful for the measurement of the cross-sectional dimensions of passages having cross-sections of various shapes but finds great application in testing tubing having a substantially circular interior cross-section. Consequently, the operation of the gauge will be described with reference to testing such tubing. In the testing of for example, boiler tubes, the arm is locked in a position perpendicular to the base by means of the screw 41, and the over-all length of the roller, extension and arm (herein referred to as the effective length of the arm) is adjusted by means of the set screw 29 to a dimension such that the roller will just touch the wall of the tube at a point where the diameter is a predetermined maximum and will not touch the wall of the tube if this maximum diameter is exceeded. The setting of the length of the arm may be facilitated by a chart giving gauge settings for a series of diameters. Such a chart may be calculated readily from trigonometric relationships of a circle representing a tube having the maximum allowable diameter and a triangle defined by the outer edge of the roller when the arm is in a perpendicular position and the two points at which the respective edges of the base plate bear upon the wall of the tube.

Figure 4:
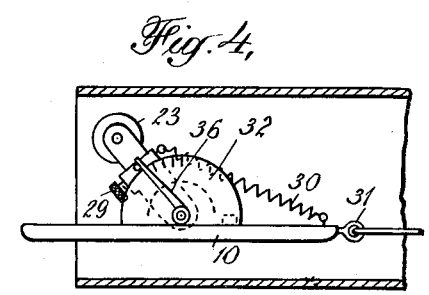
Fig. 4 is a side elevation, partly in section, showing the introduction of the gauge of Fig. 1 into a tube to be tested.
Figure 5:
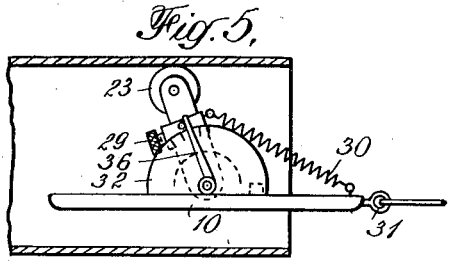
Fig. 5 is a similar view showing the gauge in operative position within the tube.
Figure 7:
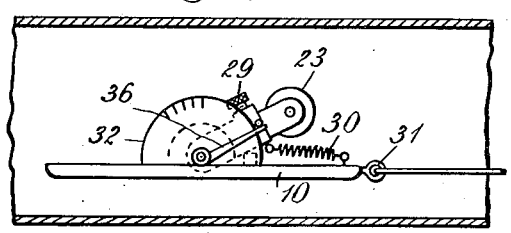
Fig. 7 is a side elevation showing the position assumed by the arm on the gauge when upon being moved through the tube, the gauge encounters a cross-section of the tube having a diameter in excess of a predetermined maximum.

The set screw 41 holding the arm in a perpendicular position is released after the effective length of the arm is adjusted and the gauge is inserted into the tube as shown in Fig. 4, i. e., the arm is pulled to the left against the tension of the spring; the pointer is rotated to the left until it substantially abuts the pin 40; the gauge in this position is inserted into the tube; and the arm is released. When the gauge is within the tube the spring pulls the roller outwardly against the wall of the tube (as shown in Fig. 5) and then the gauge is drawn or pushed through the full length of the tube. If during the passage of the gauge through the tube the maximum diameter as determined by the arm setting is exceeded, the arm will be pulled into a perpendicular position by the spring. In this position there is nothing to prevent the arm from being pulled further, so it will collapse and assume the position shown in Fig. 7. When the arm collapses, it is a clear indication that the tube has an excessive internal diameter and should be rejected. If, on the other hand, the arm does not assume a perpendicular position during passage through the tube, and hence does not collapse, the maximum angle made by the arm with the base will be indicated by the pointer on the gauge plate. The gauge plate may be graduated in degrees and a table prepared showing the diameter indicated by the respective degrees, or the gauge plate may be calibrated directly in terms of diameters.

Figure 6:
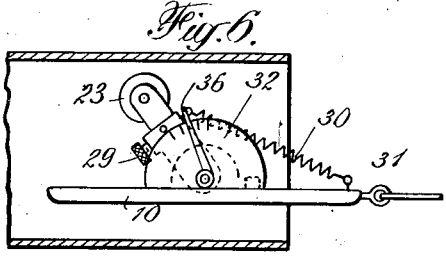
Fig. 6 is a further side elevation showing the position of the gauge for withdrawal from the tube.

If the arm does not collapse during its passage through the tube it should be prevented from collapsing as it nears the end of the tube as shown in Fig. 6. This collapse may be prevented by pushing the roller backward so that the pin 40 no longer engages the pointer arm, and the latter retains its position with respect to the gauge plate and continues to indicate the maximum diameter encountered throughout the length of the tube.

If the maximum diameter of the tube as indicated by the pointer comes within a few percent, say 5% of the maximum allowable diameter, the tube should not be rejected immediately. However, in such circumstances, experience indicates that the tube should be weighed and then rejected in the event that its weight is less than a predetermined tolerable minimum.

If desired, the gauge may be set so that it will not collapse even if a predetermined maximum diameter of tubing is exceeded. This is arranged by setting the arm length so that the arm cannot assume a perpendicular position with respect to the base plate even at excessive diameters. With the gauge so set the maximum diameter of the tube may be read from the gauge plate. However, operation of the device set so that it will collapse upon reaching a section of the tube where the tolerable internal diameter is exceeded offers a convenient and ready inspection index and is preferred.

In general, a seamless tube will have considerably greater wall thickness at its ends than at its central portions and consequently will have a greater internal diameter at a point remote from the ends. Hence, with new tubes no particular precaution need be taken in introducing the gauge into the tube. However, when testing old tubes or tubes which have been fastened into headers with a roll joint, care should be taken to insert the gauge well into the tube because the internal diameter of the tube at the rolled joint may well exceed the tolerable maximum at other sections of the tube.

I claim:

1. A gauge for testing the cross-sectional dimensions of a passage which comprises a base having side portions adapted to engage the wall of the passage at at least two points across a section thereof, an arm pivoted to the base and adapted to swing outwardly therefrom to engage the wall of the passage at a third point, and means attached to the arm and the base for causing said arm to swing outwardly and to collapse when the arm has swung outwardly from the base through a predetermined angle.

2. A gauge for testing cross-sectional dimensions of a passage which comprises a base having side portions adapted to engage the wall of the passage at at least two points across a section thereof, an arm pivoted at one end to the base and adapted to swing outwardly therefrom at least to a position substantially perpendicular with the longitudinal axis of the base and engage the wall of the passage at a third point, means attached to the arm and the base for forcing the arm outwardly against the wall of the passage, and means operatively associated with the arm and the base and carried by said base and disposed between the base and the outermost position assumed by the outer end of the arm for showing the maximum angle assumed by the arm with respect to the base.

3. A gauge for testing cross-sectional dimensions of a passage which comprises a base having side portions adapted to engage the wall of the passage at at least two points across a section thereof, an arm pivoted at one end to the base and adapted to swing outwardly therefrom at least to a position substantially perpendicular with the longitudinal axis of the base and engage the wall of the passage at a third point, means attached to the arm and the base for forcing the arm outwardly against the wall of the passage, means operatively associated with the arm and the base and carried by said base and disposed between the base and the outermost position assumed by the outer end of the arm for showing the maximum angle assumed by the arm with respect to the base, and an extension mounted on the arm to provide for changing the effective length of the arm.

4. A gauge for testing cross-sectional dimensions of a passage which comprises a base having side portions adapted to engage the wall of the passage at at least two points across a section thereof, an arm pivoted at one end to the base and adapted to swing outwardly therefrom at least to a position substantially perpendicular with the longitudinal axis of the base and engage the wall of the passage at a third point, means attached to the arm and base for forcing the arm outwardly against the wall of the passage, means operatively associated with the arm and the base and carried by said base and disposed between the base and the outermost position assumed by the outer end of the arm for showing the maximum angle assumed by the arm with respect to the base, and a roller provided at the free end of the arm.

5. A gauge for testing cross-sectional dimensions of a passage which comprises a base having side portions adapted to engage the wall of the passage at at least two points across a section thereof, an arm pivoted to the base and adapted to swing outwardly therefrom at least to a position substantially perpendicular with the longitudinal axis of the base and engage the wall of the passage at a third point, means attached to the arm and the base for forcing the arm outwardly against the wall of the passage, means operatively associated with the arm and the base and carried by said base for showing the maximum angle assumed by the arm with respect to the base, and means associated with said arm and said base for clamping the arm in a fixed position with respect to the base.

HERMAN C. KUHN.